United States Patent
Liu et al.

(10) Patent No.: US 10,134,163 B2
(45) Date of Patent: Nov. 20, 2018

(54) DYNAMIC DETECTION OF AN OBJECT FRAMEWORK IN A MOBILE DEVICE CAPTURED IMAGE

(71) Applicant: Autodesk, Inc., San Rafael, CA (US)

(72) Inventors: Ning Liu, Shanghai (CN); Lei Wang, Shanghai (CN)

(73) Assignee: AUTODESK, INC., San Rafael, CA (US)

( * ) Notice: Subject to any disclaimer, the term of this patent is extended or adjusted under 35 U.S.C. 154(b) by 73 days.

(21) Appl. No.: 15/297,006

(22) Filed: Oct. 18, 2016

(65) Prior Publication Data

US 2018/0108159 A1  Apr. 19, 2018

(51) Int. Cl.

| G06K 9/00 | (2006.01) |
|---|---|
| G06T 11/60 | (2006.01) |
| G06T 7/13 | (2017.01) |
| G06T 3/40 | (2006.01) |
| G06T 7/90 | (2017.01) |
| G06T 7/155 | (2017.01) |
| G06T 5/20 | (2006.01) |
| G06T 7/168 | (2017.01) |
| G06T 5/00 | (2006.01) |
| H04N 5/232 | (2006.01) |

(52) U.S. Cl.
CPC ............ *G06T 11/60* (2013.01); *G06T 3/40* (2013.01); *G06T 5/002* (2013.01); *G06T 5/20* (2013.01); *G06T 7/13* (2017.01); *G06T 7/155* (2017.01); *G06T 7/168* (2017.01); *G06T 7/90* (2017.01); *G06T 2207/20036* (2013.01); *G06T 2207/20061* (2013.01); *H04N 5/23293* (2013.01)

(58) Field of Classification Search
CPC ............ G06T 11/60; G06T 7/168; G06T 7/13
USPC .......................................................... 382/103
See application file for complete search history.

(56) References Cited

U.S. PATENT DOCUMENTS

| 2005/0169531 A1* | 8/2005 | Fan ........................... G06T 7/12 |
| | | 382/199 |
| 2009/0180704 A1* | 7/2009 | Wey .......................... G06T 5/50 |
| | | 382/254 |
| 2010/0085475 A1* | 4/2010 | Madnani ................. H04N 5/142 |
| | | 348/448 |
| 2011/0064327 A1* | 3/2011 | Dagher ................... G06T 5/004 |
| | | 382/263 |
| 2016/0292876 A1* | 10/2016 | Zhao ...................... G06T 7/0083 |
| 2017/0161876 A1* | 6/2017 | Carr ........................ G06T 5/002 |

OTHER PUBLICATIONS

"Scannable. The best way to move paper forward", Evernote, Oct. 6, 2016. https://evernote.com/products/scannable/.

(Continued)

*Primary Examiner* — Raj Chakraborty
(74) *Attorney, Agent, or Firm* — Gates & Cooper LLP

(57) ABSTRACT

A method, apparatus, and system provide the ability to detect an object framework in an image. A frame (of an image) is obtained. The image is pre-processed to smooth the image. Edges in the image are detected and an edge map is generated. Straight lines are detected from the detected edges in the edge map. One or more quadrangles are assembled from the detected straight lines. The quadrangles are sorted. One of the one or more quadrangles are selected based on the sorting. A selected quadrangle is returned to the user.

16 Claims, 12 Drawing Sheets

(56) References Cited

OTHER PUBLICATIONS

"Office Lens", Microsoft Corporation, Oct. 6, 2016. www.microsoft.com/en-hk/store/apps/office-lens/9wzdncrfj3t8.

"Lab color space", Wikipedia, last modified Sep. 27, 2016. https://en.wikipedia.org/wiki/Lab_color_space.

Tomasi, C., et al., "Bilateral filtering for gray and color images." Computer Vision, 1998. Sixth International Conference on. IEEE, 1998.

He, K., et al., "Guided image filtering." Pattern Analysis and Machine Intelligence, IEEE Transactions on 35.6 (2013): 1397-1409.

"Mathematical Morphology", Wikipedia, last modified Aug. 27, 2016. https://en.wikipedia.org/wiki/Mathematical_morphology.

"More Morphology Transformations", OpenCV 2.4.13.1, printed Oct. 6, 2016. http://docs.opencv.org/2.4/doc/tutorials/imgproc/opening_closing_hats/opening_closing_hats.html.

"Canny edge detector", Wikipedia, (Last Modified Sep. 2, 2016). https://en.wikipedia.org/wiki/Canny_edge_detector.

"Hough Transform", Wikipedia, last modified Sep. 1, 2016. https://en.wikipedia.org/wiki/Hough_transform.

Duda, R. O., et al., "Use of the Hough Transformation to Detect Lines and Curves in Pictures", Communications of the ACM, vol. 15, No. 1, Jan. 1972, pp. 11-15.

"Hough Line Transform", OpenCV tutorial, printed on Oct. 6, 2016.

Zhang, Z., et al., "Whiteboard Scanning and Image Enhancement", Microsoft Research, Microsoft Company, Digital Signal Processing 17.2, Jun. 2003: 414-432.

Gooch, A. A., et al., "Color2Gray: Salience-Preserving Color Removal." ACM Transactions on Graphics (TOG). vol. 24. No. 3. ACM SIGGRAPH 2005.

Canny, J. "A Computational Approach to Edge Detection", IEEE Transactions on Pattern Analysis and Machine Intelligence, vol. PAMI-8, No. 6, Nov. 1986, pp. 679-698.

"Autodesk Sketchbook"; Autodesk, Inc.; last accessed Jan. 20, 2017. https://www.sketchbook.com.

* cited by examiner

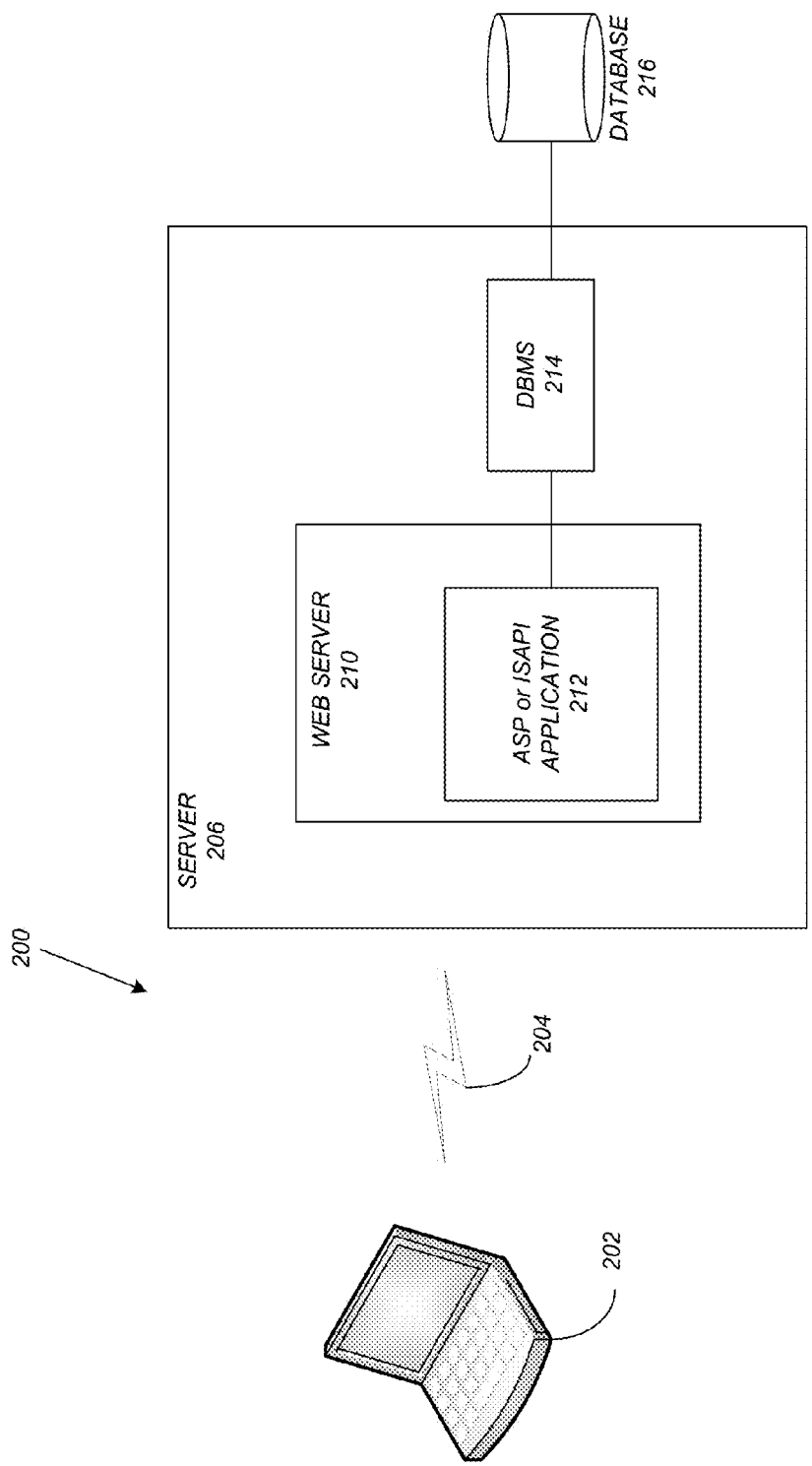

DYNAMIC DETECTION OF AN OBJECT FRAMEWORK IN A MOBILE DEVICE CAPTURED IMAGE

BACKGROUND OF THE INVENTION

1. Field of the Invention

The present invention relates generally to mobile device cameras, and in particular, to a method, system, apparatus, and article of manufacture for dynamically detecting the framework/outline of an object within an image captured by a mobile device camera/imaging system.

2. Description of the Related Art

In recent years, with increased computational power and upgraded cameras, mobile devices are able to run interesting real-time computer vision applications. In these types of applications, object framework/quadrangle detection is often an indispensable step before subsequent manipulations such as geometry transformation and text recognition. Prior art systems fail to dynamically and effectively detect/identify quadrangles or other shapes/object frameworks within an image captured by a mobile device.

SUMMARY OF THE INVENTION

When using a mobile camera and point to an object/document, embodiments of the invention enable the ability to automatically, dynamically and robustly detect an object framework such as a rectangular area/quadrangle. Such detection may be a basic operation and/or may be required in order to perform desired operations in subsequent applications (e.g., to extract content and/or to perform optical character recognition [OCR]). Embodiments of the invention may also return/display/output the identified/detected object framework/quadrangle in a camera view on the mobile device.

BRIEF DESCRIPTION OF THE DRAWINGS

Referring now to the drawings in which like reference numbers represent corresponding parts throughout:

FIG. 2 schematically illustrates a typical distributed/cloud-based computer system using a network to connect client computers to server computers in accordance with one or more embodiments of the invention;

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention acquire captured camera frames, pre-process each frame, detect edges in the frames, detect straight lines in the detected edges, assemble quadrangles/object framework shapes, sort the assembled quadrangles/shapes, and select a quadrangle/shape for output on a mobile device.

Hardware Environment

Figure 1:
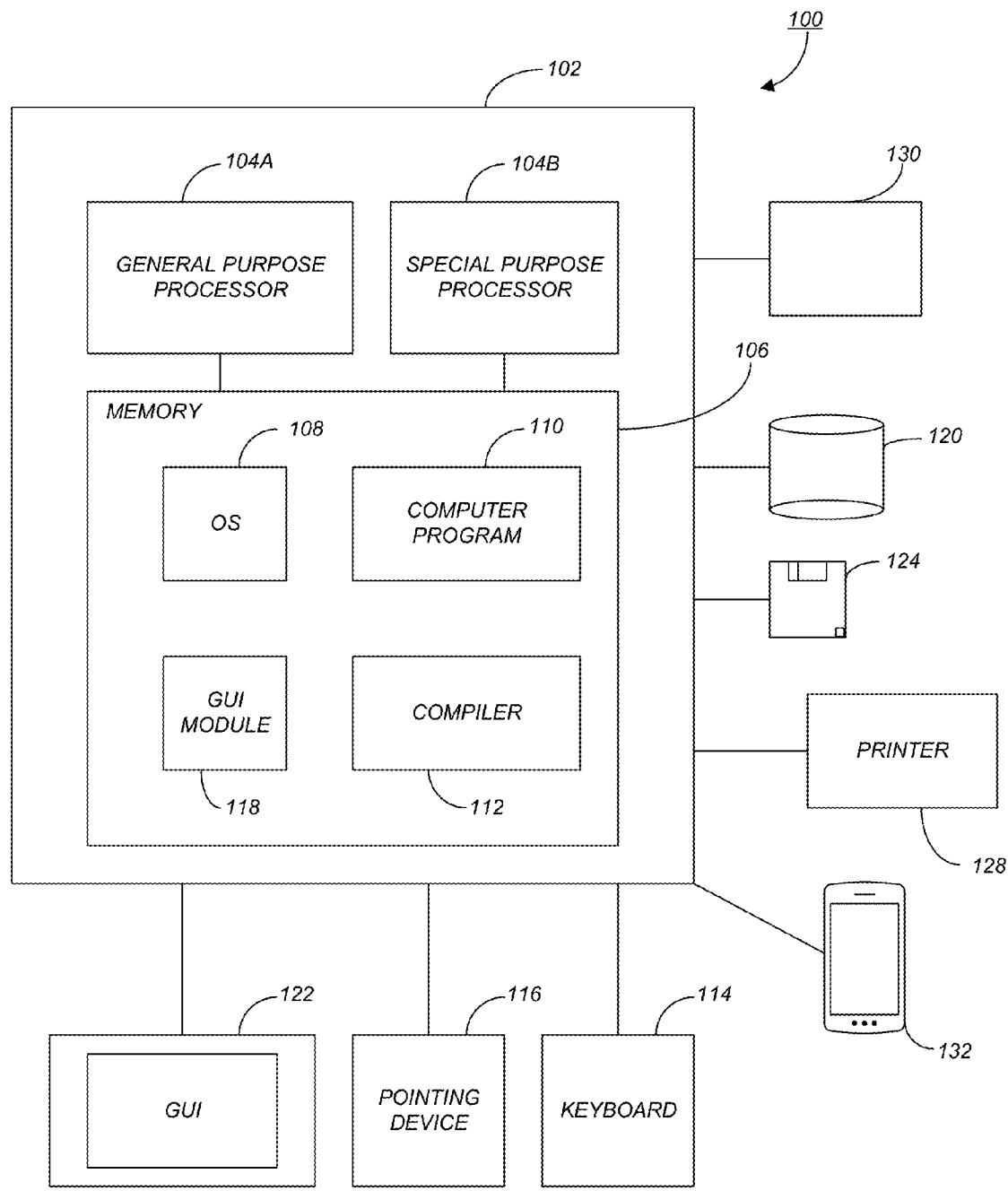
FIG. 1 is an exemplary hardware and software environment used to implement one or more embodiments of the invention.

FIG. 1 is an exemplary hardware and software environment 100 used to implement one or more embodiments of the invention. The hardware and software environment includes a computer 102 and may include peripherals. Computer 102 may be a user/client computer, server computer, or may be a database computer. The computer 102 comprises a general purpose hardware processor 104A and/or a special purpose hardware processor 104B (hereinafter alternatively collectively referred to as processor 104) and a memory 106, such as random access memory (RAM). The computer 102 may be coupled to, and/or integrated with, other devices, including input/output (I/O) devices such as a keyboard 114, a cursor control device 116 (e.g., a mouse, a pointing device, pen and tablet, touch screen, multi-touch device, etc.) and a printer 128. In one or more embodiments, computer 102 may be coupled to, or may comprise, a portable or media viewing/listening device 132 (e.g., an MP3 player, IPOD, NOOK, portable digital video player, cellular device, personal digital assistant, etc.). In yet another embodiment, the computer 102 may comprise a multi-touch device, mobile phone, gaming system, internet enabled television, television set top box, or other internet enabled device executing on various platforms and operating systems.

In one embodiment, the computer 102 operates by the general purpose processor 104A performing instructions defined by the computer program 110 under control of an operating system 108. The computer program 110 and/or the operating system 108 may be stored in the memory 106 and may interface with the user and/or other devices to accept input and commands and, based on such input and commands and the instructions defined by the computer program 110 and operating system 108, to provide output and results.

Output/results may be presented on the display 122 or provided to another device for presentation or further processing or action. In one embodiment, the display 122 comprises a liquid crystal display (LCD) having a plurality of separately addressable liquid crystals. Alternatively, the display 122 may comprise a light emitting diode (LED) display having clusters of red, green and blue diodes driven together to form full-color pixels. Each liquid crystal or pixel of the display 122 changes to an opaque or translucent state to form a part of the image on the display in response to the data or information generated by the processor 104 from the application of the instructions of the computer program 110 and/or operating system 108 to the input and commands. The image may be provided through a graphical user interface (GUI) module 118. Although the GUI module 118 is depicted as a separate module, the instructions performing the GUI functions can be resident or distributed in the operating system 108, the computer program 110, or implemented with special purpose memory and processors.

In one or more embodiments, the display 122 is integrated with/into the computer 102 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD), portable/handheld game/music/video player/console devices (e.g., IPOD TOUCH, MP3 players, NINTENDO 3DS, PLAYSTATION PORTABLE, etc.), touch tables, and walls (e.g., where an image is projected through acrylic and/or glass, and the image is then backlit with LEDs).

Some or all of the operations performed by the computer 102 according to the computer program 110 instructions may be implemented in a special purpose processor 104B. In this embodiment, some or all of the computer program 110 instructions may be implemented via firmware instructions stored in a read only memory (ROM), a programmable read only memory (PROM) or flash memory within the special purpose processor 104B or in memory 106. The special purpose processor 104B may also be hardwired through circuit design to perform some or all of the operations to implement the present invention. Further, the special purpose processor 104B may be a hybrid processor, which includes dedicated circuitry for performing a subset of functions, and other circuits for performing more general functions such as responding to computer program 110 instructions. In one embodiment, the special purpose processor 104B is an application specific integrated circuit (ASIC).

The computer 102 may also implement a compiler 112 that allows an application or computer program 110 written in a programming language such as C, C++, Assembly, SQL, PYTHON, PROLOG, MATLAB, RUBY, RAILS, HASKELL, or other language to be translated into processor 104 readable code. Alternatively, the compiler 112 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 110 accesses and manipulates data accepted from I/O devices and stored in the memory 106 of the computer 102 using the relationships and logic that were generated using the compiler 112.

The computer 102 also optionally comprises an external communication device such as a modem, satellite link, Ethernet card, or other device for accepting input from, and providing output to, other computers 102.

In one embodiment, instructions implementing the operating system 108, the computer program 110, and the compiler 112 are tangibly embodied in a non-transitory computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of computer program 110 instructions which, when accessed, read and executed by the computer 102, cause the computer 102 to perform the steps necessary to implement and/or use the present invention or to load the program of instructions into a memory 106, thus creating a special purpose data structure causing the computer 102 to operate as a specially programmed computer executing the method steps described herein. Computer program 110 and/or operating instructions may also be tangibly embodied in memory 106 and/or data communications devices 130, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 102.

FIG. 2 schematically illustrates a typical distributed/cloud-based computer system 200 using a network 204 to connect client computers 202 to server computers 206. A typical combination of resources may include a network 204 comprising the Internet, LANs (local area networks), WANs (wide area networks), SNA (systems network architecture) networks, or the like, clients 202 that are personal computers or workstations (as set forth in FIG. 1), and servers 206 that are personal computers, workstations, minicomputers, or mainframes (as set forth in FIG. 1). However, it may be noted that different networks such as a cellular network (e.g., GSM [global system for mobile communications] or otherwise), a satellite based network, or any other type of network may be used to connect clients 202 and servers 206 in accordance with embodiments of the invention.

A network 204 such as the Internet connects clients 202 to server computers 206. Network 204 may utilize ethernet, coaxial cable, wireless communications, radio frequency (RF), etc. to connect and provide the communication between clients 202 and servers 206. Further, in a cloud-based computing system, resources (e.g., storage, processors, applications, memory, infrastructure, etc.) in clients 202 and server computers 206 may be shared by clients 202, server computers 206, and users across one or more networks. Resources may be shared by multiple users and can be dynamically reallocated per demand. In this regard, cloud computing may be referred to as a model for enabling access to a shared pool of configurable computing resources.

Clients 202 may execute a client application or web browser and communicate with server computers 206 executing web servers 210. Such a web browser is typically a program such as MICROSOFT INTERNET EXPLORER, MOZILLA FIREFOX, OPERA, APPLE SAFARI, GOOGLE CHROME, etc. Further, the software executing on clients 202 may be downloaded from server computer 206 to client computers 202 and installed as a plug-in or ACTIVEX control of a web browser. Accordingly, clients 202 may utilize ACTIVEX components/component object model (COM) or distributed COM (DCOM) components to provide a user interface on a display of client 202. The web server 210 is typically a program such as MICROSOFT'S INTERNET INFORMATION SERVER.

Web server 210 may host an Active Server Page (ASP) or Internet Server Application Programming Interface (ISAPI) application 212, which may be executing scripts. The scripts invoke objects that execute business logic (referred to as business objects). The business objects then manipulate data in database 216 through a database management system (DBMS) 214. Alternatively, database 216 may be part of, or connected directly to, client 202 instead of communicating/obtaining the information from database 216 across network 204. When a developer encapsulates the business functionality into objects, the system may be referred to as a component object model (COM) system. Accordingly, the scripts executing on web server 210 (and/or application 212) invoke COM objects that implement the business logic. Further, server 206 may utilize MICROSOFT'S TRANSACTION SERVER (MTS) to access required data stored in database 216 via an interface such as ADO (Active Data Objects), OLE DB (Object Linking and Embedding Data-Base), or ODBC (Open DataBase Connectivity).

Generally, these components 200-216 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 202 and 206 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 202 and 206. Embodiments of the invention may be implemented as a software application on a client 202 or server computer 206. Further, as described above, the client 202 or server computer 206 may comprise a thin client device or a portable device that has a multi-touch-based display.

Figure 3B:
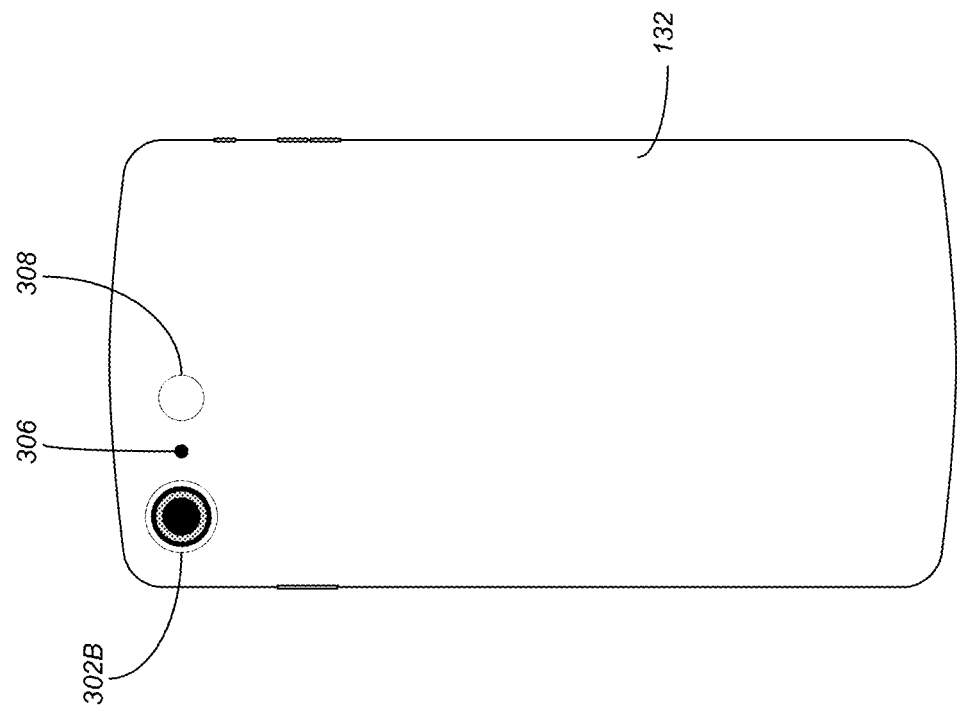
FIGS. 3A and 3B illustrate the front and back/rear respectively of a mobile phone/cellular phone/portable viewing device that may be used in accordance with one or more embodiments of the invention.
Figure 3A:
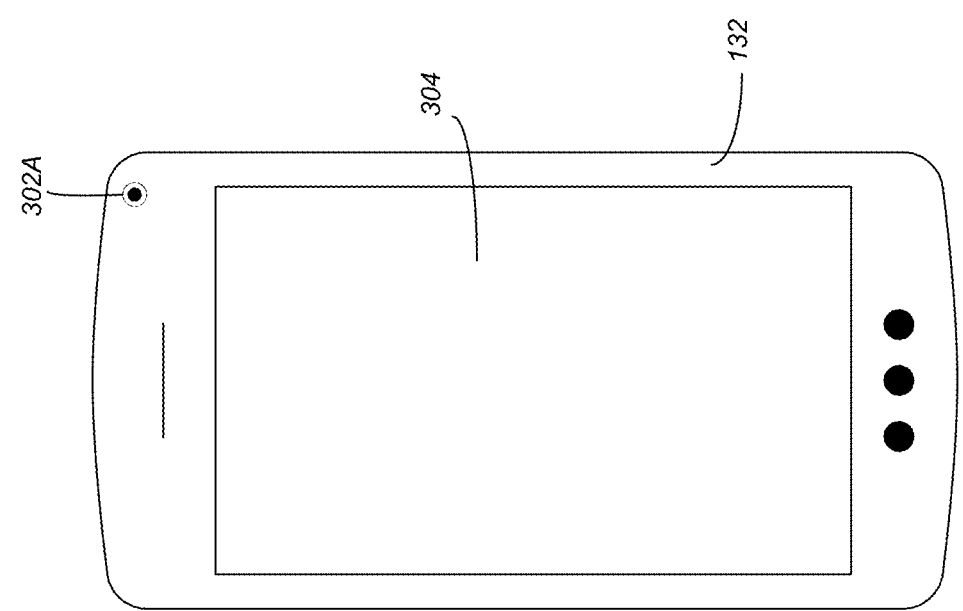

FIGS. 3A and 3B illustrate the front and back/rear respectively of a mobile phone/cellular phone/portable viewing device 132 that may be used in accordance with one or more embodiments of the invention. Device 132 may contain a front facing camera/image capture mechanism 302A that may be used to capture an image of the scene that is then displayed in area 304. Device 132 may contain a rear/back facing camera 302B. Cameras 302 may also be referred to as lenses of an image acquiring component. While located in the upper right corner of the device 132 in FIG. 3A and the upper-left corner of the device 132 of FIG. 3B, alternative embodiments may locate the front camera 302A and/or rear/back facing camera 302B in different locations (e.g., center of the (mobile) device 132, top-center of the mobile device 132, top-right of the mobile device 132, etc.). Although not required, mobile device 132 may also include a microphone 306 and/or a flash 308.

Of course, those skilled in the art will recognize that any combination of the above components, or any number of different components, peripherals, and other devices, may be used with computers 102 and 106, and/or mobile/tablet device 132.

Object Framework Detection

Problem and Detection Overview

As described above, detection of the geometric shape/framework/quadrangle of an object is an important procedure in computer vision applications. For example, when a user attempts to capture a rectangular area with his/her device camera, the expected quadrangle/geometric shape should be automatically returned in the camera view/display area 304.

Figure 4:
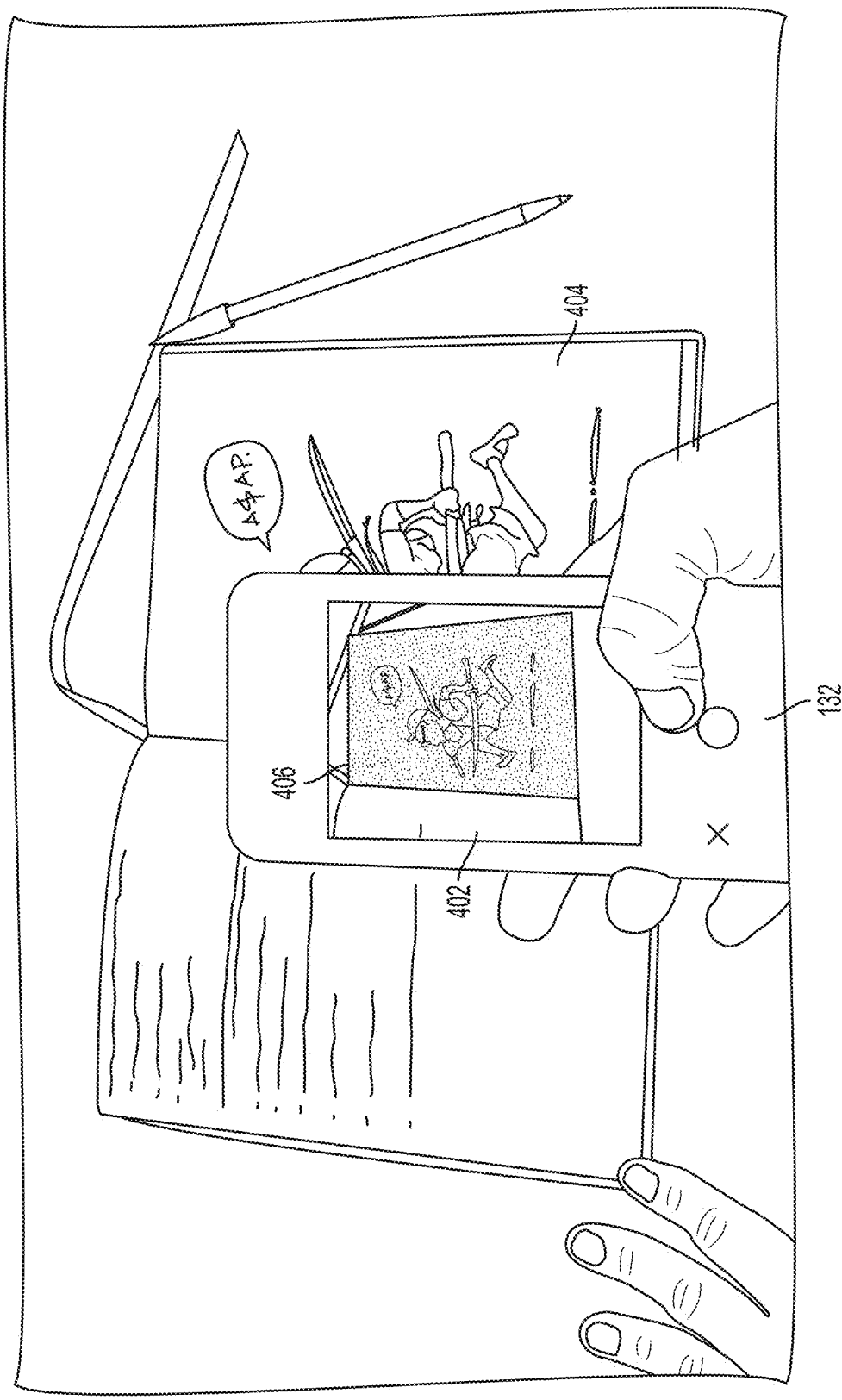
FIG. 4 illustrates an exemplary use of such a mobile application attempting to capture an image drawn in a book in accordance with one or more embodiments of the invention.

As an example, in the AUTODESK SKETCHBOOK mobile application, a scan module may be used to connect physical and digital drawing experiences. FIG. 4 illustrates an exemplary use of such a mobile application attempting to capture an image drawn in a book in accordance with one or more embodiments of the invention. In a typical use case, a user can draw on real paper, and then scan the drawing into the SKETCHBOOK application for subsequent processing such as coloring. As shown in image 402, when the user points the mobile device 132 to the drawing canvas 404, embodiments of the invention may automatically detect the quadrangle 406 surrounding the canvas 404.

However, detecting the correct quadrangle can be very challenging. As the background can be messy with other objects rather than the drawing, such objects may provide noisy information that leads to incorrect answers/quadrangles.

Embodiments of the invention provide a robust method for handling real-time quadrangle detection. Further, embodiments of the invention attempt to return the best quadrangle that the camera points to.

Logical Flow

Figure 5:
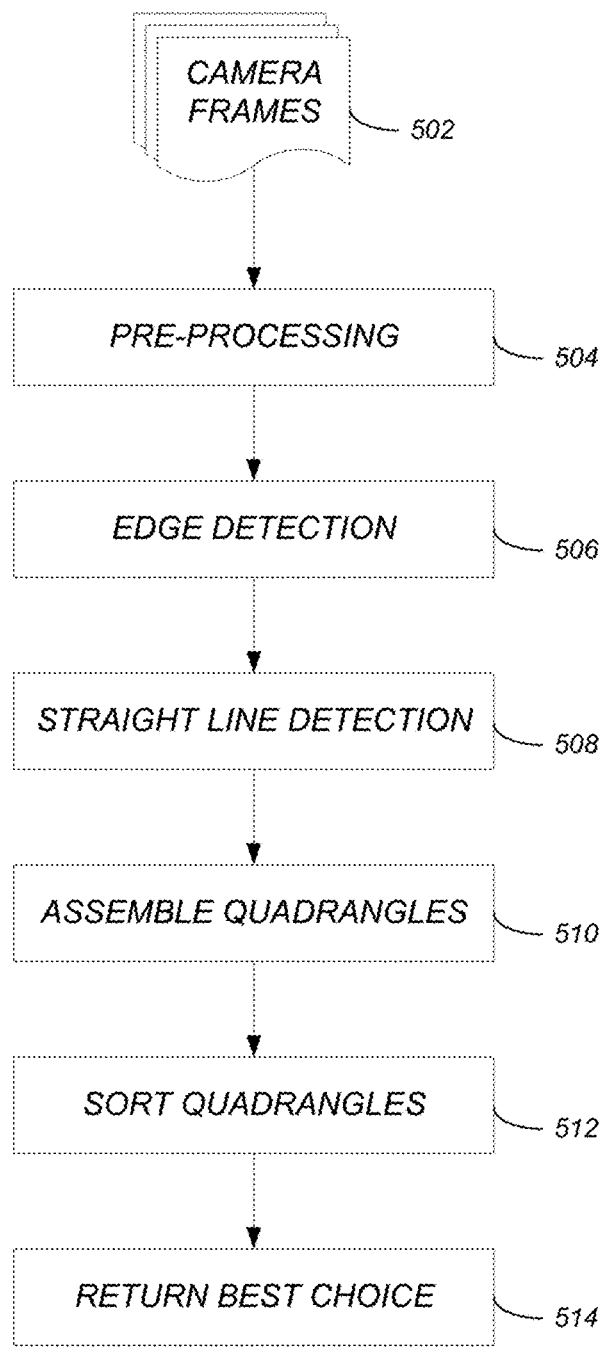
FIG. 5 illustrates the logical flow for detecting object frameworks in accordance with one or more embodiments of the invention.

FIG. 5 illustrates the logical flow for detecting object frameworks in accordance with one or more embodiments of the invention. Such a method may be implemented and executed by/as part of a mobile application (e.g., a drawing application or an add-on/application program interface [API] of a mobile application) within mobile device 132.

Input to the detection method consists of camera frames 502. Thus, the camera/mobile device 132 first captures camera frames. As an example, camera/mobile device 132 may capture video frames.

At step 504, the camera frames 502 are pre-processed (e.g., to smooth the images).

At step 506, the edges in the image are detected (e.g., to find edges in the image).

At step 508, the detected edges are used to determine/detect straight lines.

At step 510, quadrangles (and/or other geometric shapes) are assembled from the straight lines. For example, the straight lines are used to form the quadrangles.

At step 512, the quadrangles are sorted.

At step 514, based on the sorting, the best choice quadrangle is chosen/selected and returned to the user.

As described herein, while details may describe a specific implementation relating to quadrangles, other shapes such as hexagons, octagons, triangles, etc. may also be used.

The following sections describe each of the steps 504-514 in detail.

Pre-Processing 504 and Edge Detection 506

Figure 6:
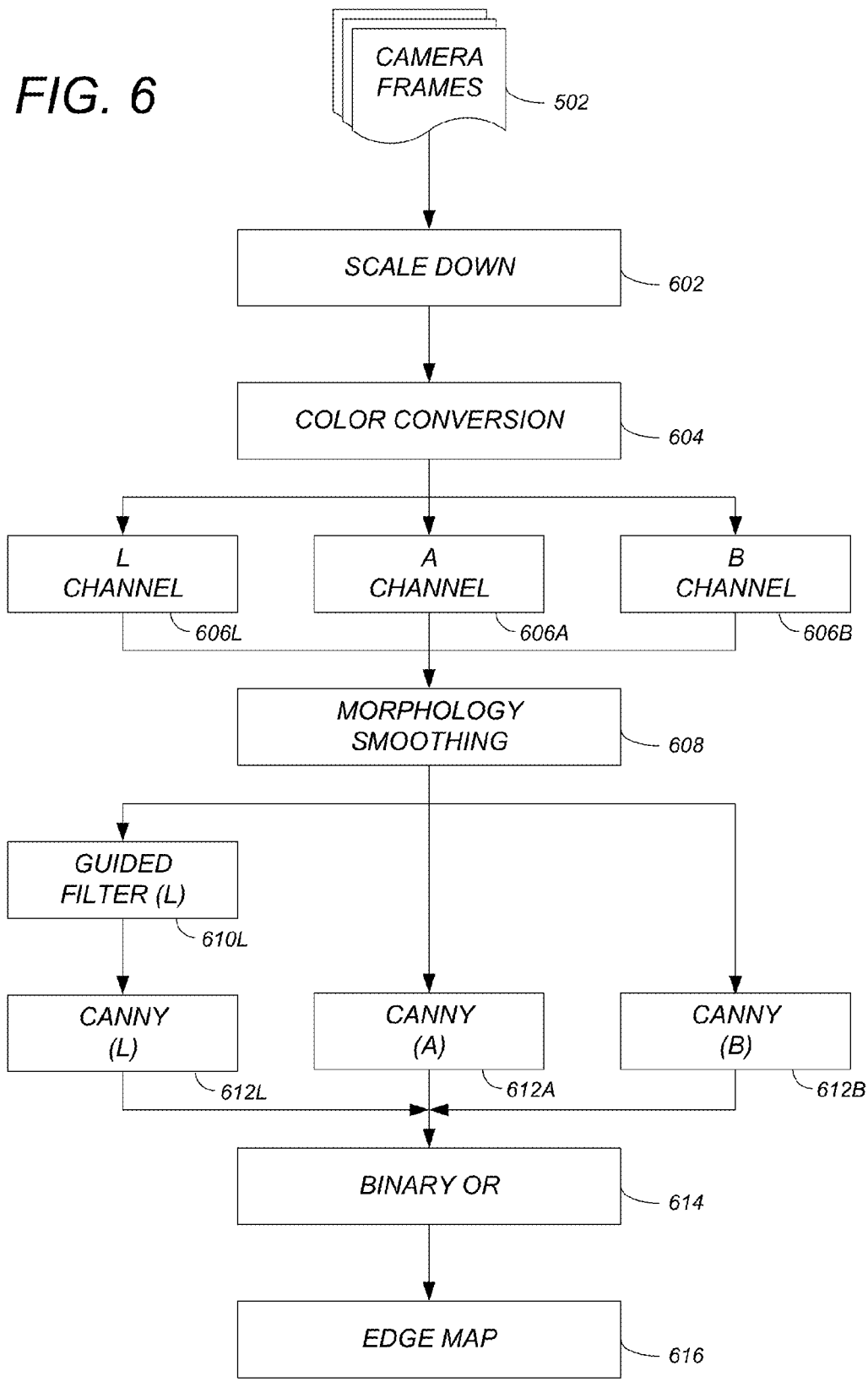
FIG. 6 illustrates the pre-processing and edge detection framework in accordance with one or more embodiments of the invention.

FIG. 6 illustrates the pre-processing 504 and edge detection 506 framework in accordance with one or more embodiments of the invention.

The camera frames 502 are used as input. At step 602, the size of the input camera frames 502 are scaled down (e.g., to around 500 pixels on its long side) to accelerate the processing (e.g., a large resolution image is scaled down to a small resolution image).

At step 604, the scaled images are color converted to output a luminance component/channel 606L, and two chrominance components/channels—A channel 606A and B channel 606B. In this regard, traditional method may perform operations on a gray-level image [4]. However, in embodiments of the invention, the color image is used in Lab color space (e.g., L for lightness and a and b for the color-opponent dimensions, based on nonlinearly compressed coordinates) ([3]). The reason for performing the color conversion 604 is twofold:

- Information is lost in conversion from color to gray, which makes edge detection difficult for gray-level images [5]; and
- A different smoothing level can be used over luminance and chrominance components.

In view of the above, step 604 separates the RGB color into the luminance component L (606L) and color components a 606A and b 606B. In this regard, color components 606A/606B may be necessary because sometimes image contrast is caused by color variance rather than luminance variance. Further, a, b channels 606A/606B may be less noisy than the luminance channel 606L. In turn, with less noise, only using morphology smoothing may provide a sufficient result, thereby saving on computation efforts.

Once scaled down at 602 and color converted at step 604, a two-stage smoothing is performed: first with a morphology operation 608 followed by detail preserving filtering 610-614. The morphology operation 608 helps remove small-scale details such as dots and small objects.

In one or more embodiments, such morphology smoothing includes the application of a morphology operation to each of the Lab channels 606. Any type of morphology operation may be performed ([8], [9]). One or more embodiments of the invention may use an "opening" morphology operation in which small bright details are removed from a dark background.

After the smoothing 608, a detail-preserving filter 610-614 may be applied to further remove noisy areas such as textures. Embodiments of the invention may not use a simple Box filter or Gaussian filter because such filters may blur the image resulting in an overkill of important edge information. Instead, embodiments of the invention may use a bilateral filter [6] or a guided filter [7] to smooth the image. Both methods have been tested and it has been found that the guided filter performs slightly better than the bilateral filter with a small overhead. Accordingly, at step 610L, a guided filter is applied to the luminance channel 606L. Such an application of the guided filter 610L to only the luminance channel 606L (instead of to the A channel 606A and B channel 606B as well) may be performed because it is computationally expensive.

At step 612, a Canny edge detector is used to generate a binary edge map 616. In particular, the Canny edge detector 612 is applied over each channel (612L, 612A, and 612B), and the results are merged using a binary OR operator at 614. In one or more embodiments, taking the image as input, the Canny detector outputs a binary mask in which edges are located in high intensity valued positions. In other words, the input to a Canny detector is a single channel image and the output is a binary image showing the edges. In many application, the input image may first be converted into a gray image before performing the Canny edge detection. However, in embodiments of the invention, as described above, the input image is first converted into Lab color space, and the Canny detector is applied to each of the channels 612L, 612A, and 612B, followed by the merger of the results at 614 (i.e., that combines the edges identified in each of the channels). Embodiments of the invention may utilize the Canny Edge detectors set forth in [10] and [11]. Such a methodology proves to be robust because it covers edges from both luminance and chromatic variance.

Straight Line Detection 508

After the edge map is generated in step 506, many lines/edges exist. In this regard, in the real world, there are many things in an image that will create lines/edges. For example, when a real object is scanned/imaged, such as a book, there may be a thickness that creates multiple lines. To accurately generate an object framework/quadrangle for the object (e.g., the book), one needs to only have one line that represents the contour of the object. Step 508 serves to detect straight lines and to remove superfluous/incorrect lines.

After the edge map is generated, a Hough transform may be used to compute straight lines. A Hough transform is a feature extraction technique based on a voting procedure. Given a single point $(x_0, y_0)$ in the plane, the set of all straight lines going through that point corresponds to a sinusoidal curve in the $(r, \theta)$ plane.

$$r_\theta = x_0 \cos \theta + y_0 \sin \theta$$

Figure 7:
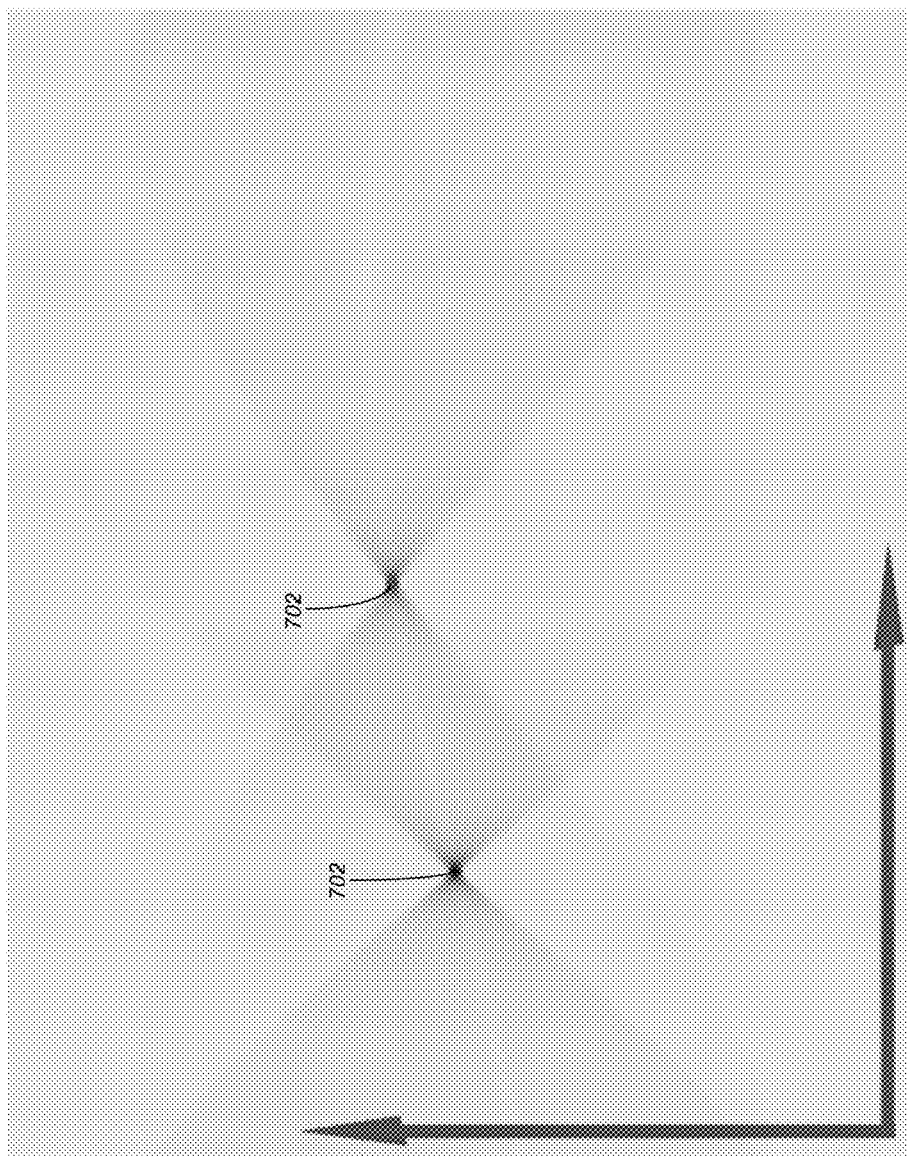
FIG. 7 illustrates sinusoidal curves drawn in accordance with one or more embodiments of the invention.

For a line passing through the point, all points on the line will generate a group of curves. One can discretize the $(r, \theta)$ plane into finite bins, loop all of the pixels of an image, and draw the sinusoidal curves on the plane. FIG. 7 illustrates such a drawing in accordance with one or more embodiments of the invention. Thereafter, by finding the most significant cross point in the $(r, \theta)$ plane, one can obtain the parameters of the most significant lines. As shown in FIG. 7, the two dark spots 702 indicate there are two major lines. In embodiments of the invention, the binary mask is taken from the Canny edge detector as input, and the transform votes for the positions in the mask where edges exist. Details regarding Hough transforms are described in [12], [13], and [14].

Figure 8:
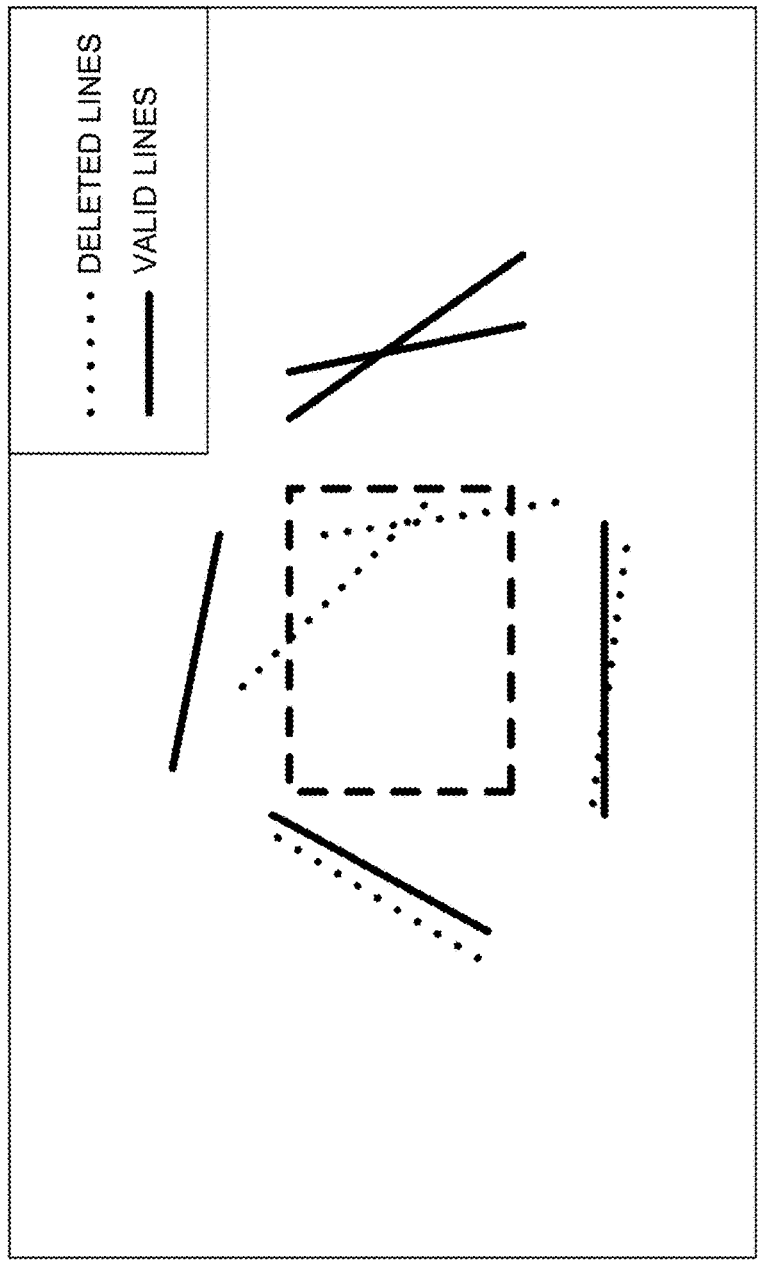
FIG. 8 illustrates valid lines and removed/deleted lines in accordance with one or more embodiments of the invention.

Each straight line is a line segment represented by its two end points. To reduce unnecessary calculations, the lines are first sorted according to their saliency returned by the Hough transform. Thereafter, embodiments of the invention only consider a limited amount of the most dominant lines (i.e., the lines may be pruned to reduce the computation burden). Accordingly, extra lines are removed that are near-parallel and close to each other, because they represent the same edge. Further, lines intersecting the small region near the center of the frame are also removed, because in real practice, the user would try to put the target in the center of the camera, so the lines near the center are not likely to be a real edge. FIG. 8 illustrates the valid lines and removed/deleted lines in accordance with one or more embodiments of the invention.

To determine whether two lines are close to each other, a threshold distance/value may be used (i.e., if the distance between two lines is within a threshold distance, the two lines are identified as being close). Similarly, to determine if lines are near-parallel to each other, the slopes of the lines are compared to each other to determine if the difference is within a defined slope threshold. As illustrated in FIG. 8, the dotted lines are removed. In one or more embodiments, once two lines are identified as near parallel and close, one of the lines is removed/selected for removal. The line selected for removal may be random as the type of feature being identified may not require a high level of accuracy (e.g., small features such as a piece of paper on a table). Accordingly, during the straight line detection step 508, a limited amount of dominant lines are selected.

Quadrangle Assembly 510

Once the list of lines has been received (from the straight line detection step 508), a determination is made regarding which four of the straight lines form a quadrangle. It may be noted that embodiments of the invention are not limited to quadrangles and other shapes may be identified as well (e.g., five or six of the straight lines may be used to create pentagons or hexagons).

To avoid excessive computations, and for efficiency, all of the combinations of lines may not be iterated. Instead, embodiments of the invention may be based on a simple assumption: the reasonable quadrangle should be near the center of the frame because that is the direction the user is attempting to capture. Based on this assumption, the line segments are divided into horizontal lines and vertical lines, then further divided into four categories/quadrants according to each line segment's relative position to the center of the frame (top horizontal, bottom horizontal, left vertical, right vertical.

Figure 9:
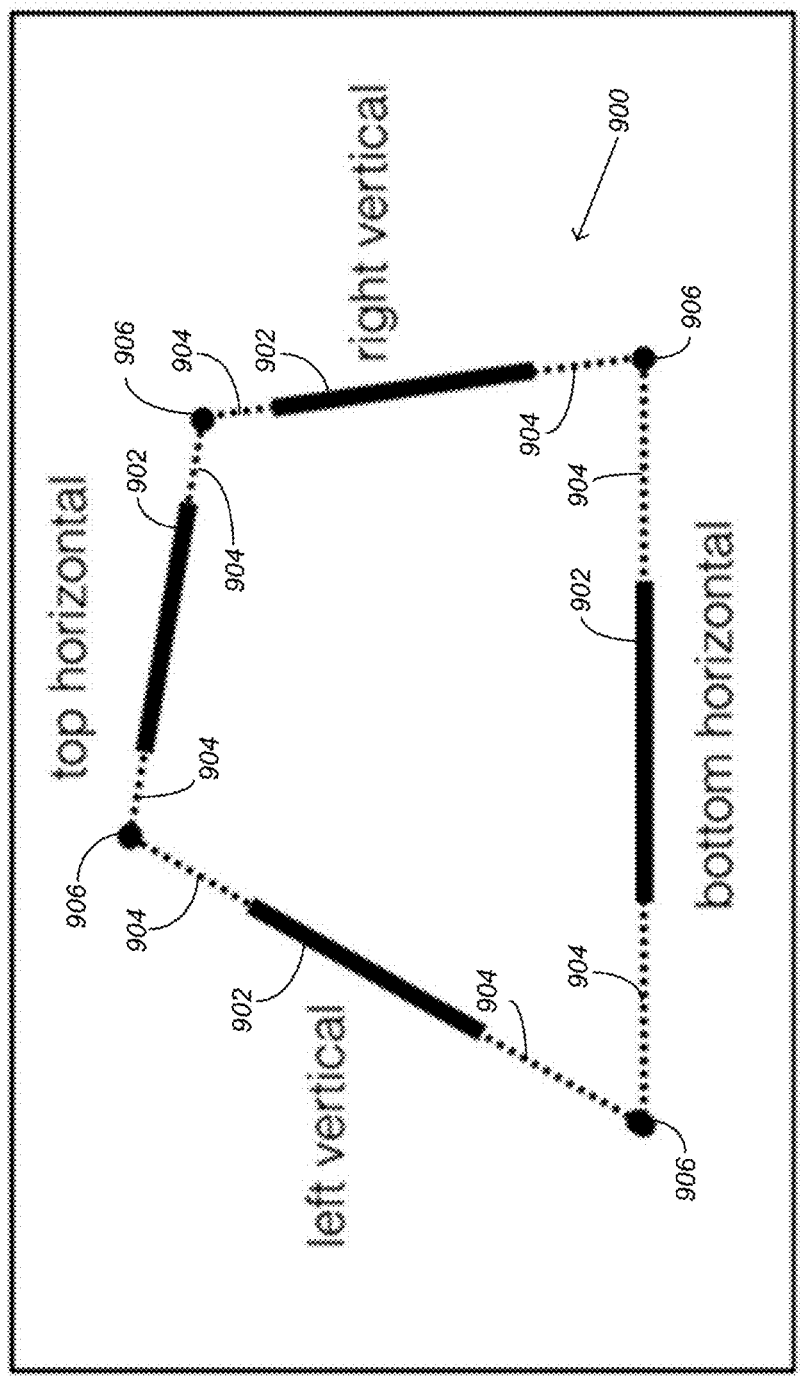
FIG. 9 illustrates an exemplary quadrangle with one line selected from each quadrant in accordance with one or more embodiments of the invention.

Once divided into quadrants, one line from each category is fetched (e.g., at random) and the four intersection points are computed (e.g., which may require extension of one or more of the lines). FIG. 9 illustrates an exemplary quadrangle 900 with one line 902 selected from each quadrant. The lines 902 have each been extended 904 and the intersection points 906 are computed. A good candidate quadrangle should satisfy the following conditions:

The four intersection points are all inside the frame (i.e., the frame of the mobile device and/or of the captured image);

The area of the quadrangle is sufficiently large (i.e., the area is within a threshold area range) (e.g., the area is more than 10% of the whole frame area); and The angle between adjacent lines should be in a limited range around 90 degrees (e.g., within a threshold range of 90 degrees).

Once the three conditions are met, the quadrangle is regarded as a valid candidate, and the process passes to the next step.

Embodiments of the invention don't loop through all of the combinations of the four categories of lines to find the best quadrangles. As the line bins are sorted by significance (in accordance with the Hough transform that sorts based on saliency), only the most M dominate lines are picked from each bin (e.g., in one or more embodiments, M=3). In this way, only a limited number of quadrangles will pass to the next step, so the computation is still efficient. Accordingly, the process assembles quadrangles as described above by looping through all of the possible combinations of the most M-dominant lines from each quadrant/category.

Sort Quadrangles 512

Once a set of candidate quadrangles is obtained in step 510, the best reasonable quadrangle needs to be selected as a result. Two metrics of each candidate quadrangle may be evaluated: consistency and area.

Consistency basically describes whether the quadrangle's edges can be found in the edge map, in other words, whether it represents a real edge in the scene.

Discrete points are sampled along an edge, and the edge consistency is measured by computing the percentage of valid samples according to the edge map.

$$\text{Edge Consistency} = 100 * \frac{\text{valid samples}}{\text{total samples}}$$

A sample is valid if and only if the sample position in the edge map has a large intensive value (e.g., 255 for Canny edge detection). In practice, as an edge is not definitely straight, a single point is not sampled to query its intensity value, instead, a small area around the point's position is sampled, and the maximum intensity value of the whole area is queried. Further, sampling near the end points is skipped because a real world rectangle may not have hard sharp corners. Such processing achieves a much more stable result (compared to sampling individual points only and not a small local area surrounding the point.

Figure 10:
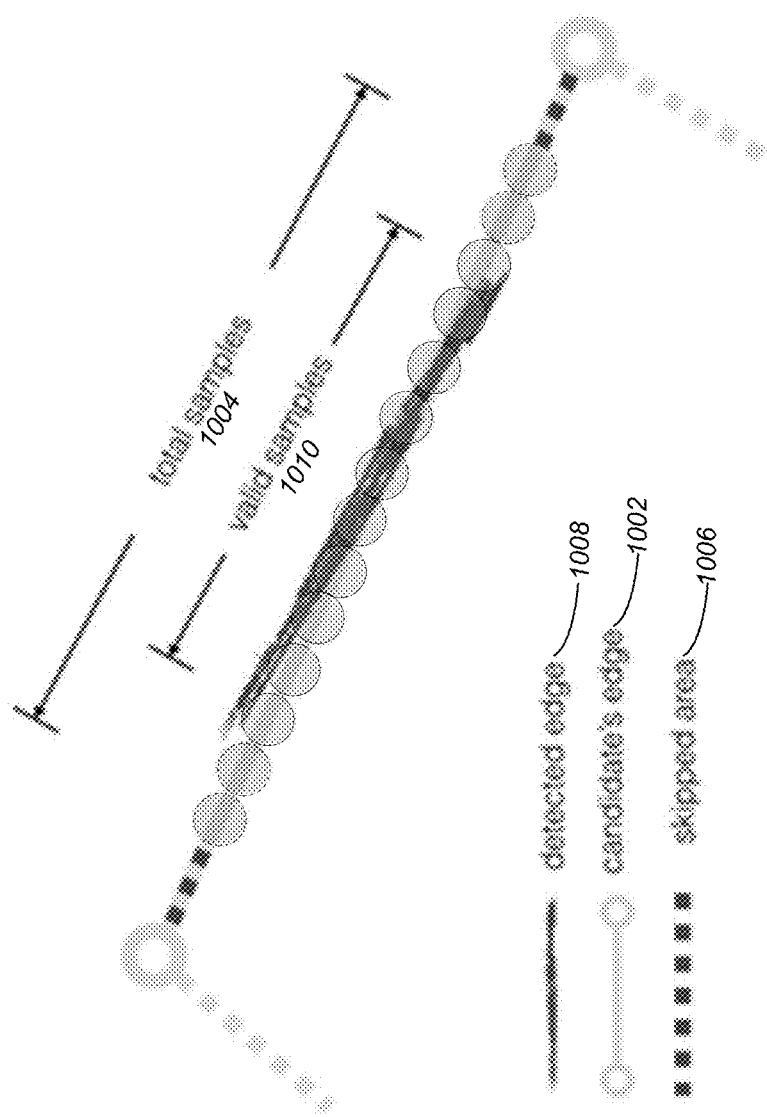
FIG. 10 illustrates the calculation of edge consistency in accordance with one or more embodiments of the invention.

FIG. 10 illustrates the calculation of edge consistency in accordance with one or more embodiments of the invention. As illustrated, the candidate edge 1002 is the quadrangle's edge. Discrete points on edge 1002 are sampled (total samples 1004) leaving skipped areas 1006 of the candidate edge 1002. Those total samples 1004 that are in the edge map (i.e., a detected edge 1008) are identified as valid samples 1010. From the valid samples 1010 and total samples 1004, the edge consistency can be determined (i.e., a measurement that determines how consistent the edge of the quadrangle is with representing an actual edge from a scanned object).

Figures 11A, 11B, 11C, 11D:
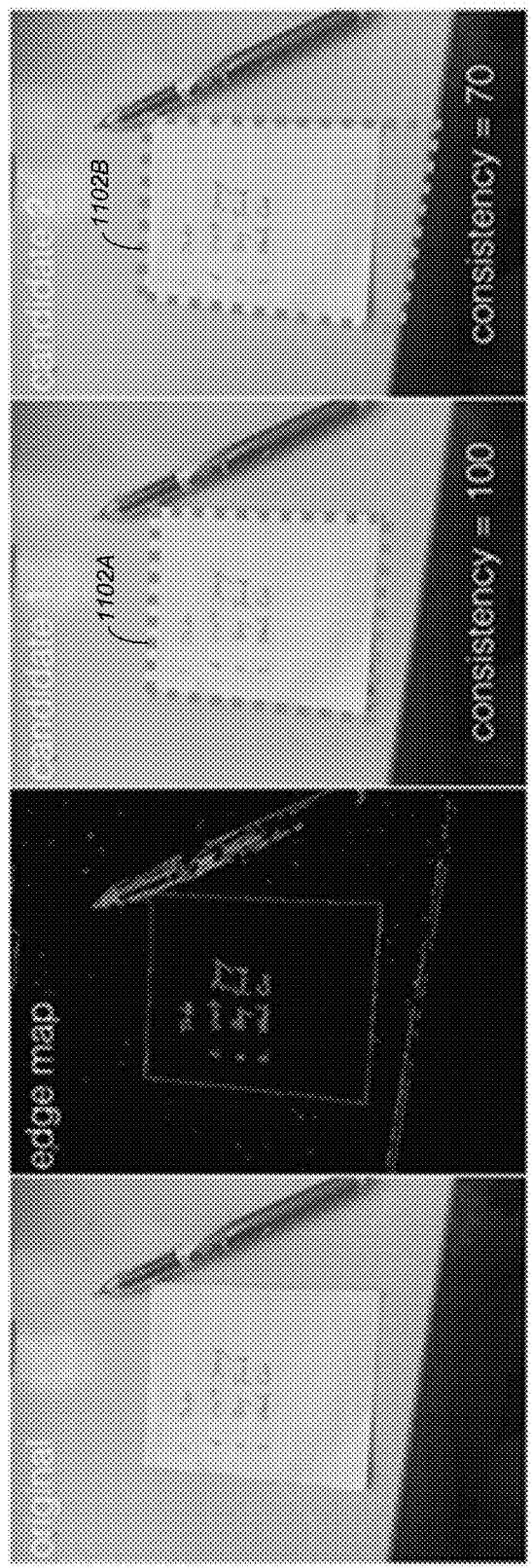
FIGS. 11A-11D illustrate an original image, an edge map, and two candidate quadrangles in accordance with one or more embodiments of the invention.

Once the edge consistency has been determined, the quadrangle's consistency can be defined as the minimal value of its four edge consistency values. FIGS. 11A-11D illustrate an original image, an edge map, and two candidate quadrangles in accordance with one or more embodiments of the invention. In particular, FIG. 11A illustrates an original scanned image of a piece of paper and a pen on a desk. FIG. 11B illustrates the edge map output from edge detection step 506. As illustrated, the edge map is a binary image that illustrates edges in white and the remaining elements of the object in black.

FIGS. 11C and 11D illustrate two candidate quadrangles with different consistency values marked by dotted wireframes 1102A and 1102B respectively. As shown in FIG. 11D, candidate 2's vertical edges cannot fully map to the edge map of FIG. 11B, so it has a lower consistent value than candidate 1 (e.g., 70 compared to 100). Normally, a larger consistency value indicates the candidate is more likely to be a good choice.

In practical cases, there might be several candidates with very close consistency values, thus area may be used as a second metric: for candidates with close consistency values, the candidate with the largest area is selected as the result. Such an approach may be viewed as a reasonable strategy because it is intuitive to move the camera closer if the user would like to capture smaller rectangles.

Lighting conditions and camera shaking can sometimes lead to an unstable edge map that, in turn, will result in unstable consistency values. Accordingly, embodiments of the invention may utilize two strategies to improve the robustness:

- Consistency values are only discretized into limited values, for example multiples of 10. In this way, small variations in the consistency values won't have a significant impact; and
- Candidates from several continuous frames are considered, rather than a single frame. Consideration of several continuous frames serves to behave like a smoothing effect, reducing the impact of errors in each single frame.

For implementation, a queue is used to store candidates from the most recent five (5) frames. Each time a new frame is processed, the earliest frame's candidates are removed from the queue. Thereafter, candidates from the current frame are inserted into the queue in a largest-consistency-first and largest-area-first sequence/order. The exemplary code in Table 1 illustrates the process for inserting a candidate in accordance with one or more embodiments of the invention:

TABLE 1

```
InsertCandidate(candidateQueue, newCandidate)
    index=0
    while ( index < candidateQueue.size &&
            newCandidate.consistency
            <=candidateQueue[index].consistency)
        index=index+1
    while ( index > 0 &&
            newCadidate.area > candidateQueue[index-1].area &&
            newCandidate.consistency >=
            candidateQueue[index-1].consistency)
        index=index-1
    candidateQueue.Insert(index, newCandidate)
```

Figure 12A:
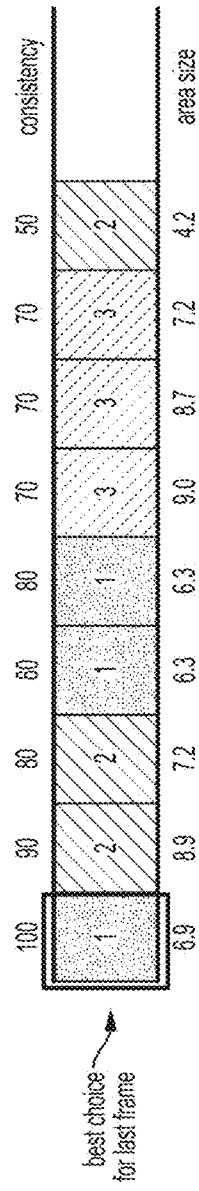
FIGS. 12A-12C illustrates the process for maintaining a queue of quadrangles over multiple captured frames.

The process set forth in the code of Table 1 can be explained with reference to FIGS. 12A-12C. In the example illustrated in FIGS. 12A-C, only the most recent three (3) frames' candidates are considered. In this regard, as the user captures successive frames in time, each captured frame is different (slightly different in some instances or more significantly different in other instances). Each box represents a candidate with an integer (i.e., 1-4) indicating during which frame the candidate is detected. The numbers in the row on top of the quadrangle candidates represent the consistency values corresponding to each candidate. The numbers in the row below the quadrangle candidates represent the area size corresponding to each candidate. Within the queue, the index value (referring to Table 1 above) represents the location within the queue). All of the candidates are sorted first by consistency and second by area size (regardless of the frame number). Thus, in FIG. 12A (which represents the first three (3) frames captured), the best candidate choice is the candidate in frame 1 with a consistency value of 100 and area size of 6.9. As the candidate list is always sorted, the first candidate may always be selected as the best choice.

Figure 12B:
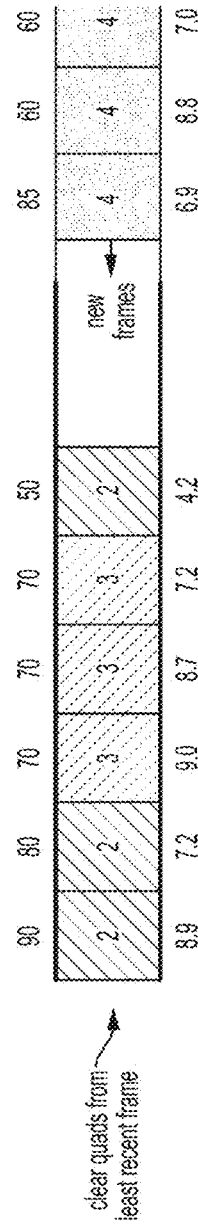

FIG. 12B illustrates the introduction of new frame 4, in which case the candidates in the oldest/least recent frame (i.e., frame 1) are cleared/removed from consideration.

Figure 12C:
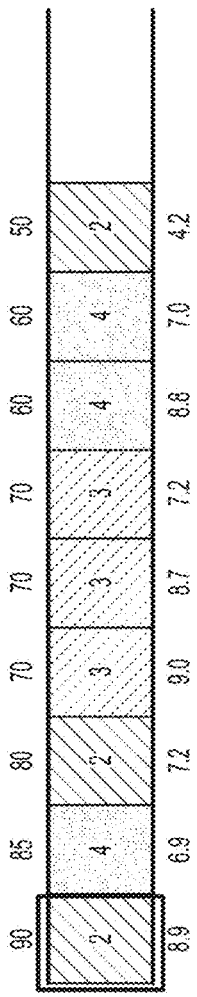

Once new frame 4 has been processed, all of the candidate quadrangles from frame 4 are integrated into the sorted list of candidates based on their consistency score and area (as illustrated in FIG. 12C and Table 1).

Thus, when new frame 4 is processed, the least recent candidates of frame 1 are removed from the queue (as illustrate din FIG. 12B), and then the candidates of frame 4 are inserted using the method set forth in Table 1 (as illustrated in FIG. 12C). In particular, the method (in the first while statement) compares the consistency values and moves through the queue placing the candidate in the appropriate location based on consistency value. In the second while statement, if the consistency values are the same, the area is used to identify the proper location for the candidate. Once sorted, the head of the queue always returns the best choice as the best-fit quadrangle.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention. In summary, embodiments of the invention provide the ability to rapidly, efficiently, dynamically, and robustly detect a quadrangle in an image (e.g., scanned from a mobile device). Such a detection system may be used on mobile applications and/or any type of computer vision/virtual reality related projects.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES (Note: This application references a number of different publications as indicated throughout the specification above by reference numbers enclosed in brackets, e.g., [x]. A list of these different publications ordered according to these reference numbers can be found below. Each of these publications is incorporated by reference herein):

[1] Evernote Scannable. evernote.com/products/scannable (Oct. 6, 2016).

[2] Microsoft OfficeLens. www.microsoft.com/en-hk/store/apps/office-lens/9wzdncrfj3t8 (Oct. 6, 2016)

[3] Lab color space. en.wikipedia.org/wiki/Lab_color_space (Last Modified Sep. 27, 2016).

[4] Zhang, Zhengyou, and Li-Wei He. "Whiteboard scanning and image enhancement." Digital Signal Processing 17.2 (2007): 414-432.

[5] Gooch, Amy A., et al. "Color2gray: salience-preserving color removal." ACM Transactions on Graphics (TOG). Vol. 24. No. 3. ACM, 2005.

[6] Tomasi, Carlo, and Roberto Manduchi. "Bilateral filtering for gray and color images." Computer Vision, 1998. Sixth International Conference on. IEEE, 1998.

[7] He, Kaiming, Jian Sun, and Xiaoou Tang. "Guided image filtering." Pattern Analysis and Machine Intelligence, IEEE Transactions on 35.6 (2013): 1397-1409.

[8] Mathematical Morphology, en.wikipedia.org/wiki/Mathematical_morphology (Last modified Aug. 27, 2016).
[9] More Morphology Transformations, docs.opencv.org/2.4/doc/tutorials/imgproc/opening_closing_hats/opening_closing_hats.html (Printed Oct. 6, 2016).
[10] Canny, John. "A computational approach to edge detection." IEEE Transactions on pattern analysis and machine intelligence 6 (1986): 679-698.
[11] Canny edge detector, en.wikipedia.org/wiki/Canny_edge_detector (Last Modified Sep. 2, 2016).
[12] Hough Transform, en.wikipedia.org/wiki/Hough_transform (Last Modified Sep. 1, 2016).
[13] Duda, Richard O., and Peter E. Hart. "Use of the Hough transformation to detect lines and curves in pictures." Communications of the ACM 15.1 (1972): 11-15.
[14] Hough Line Transform, docs.opencv.org/2.4/doc/tutorials/imgproc/imgtrans/hough_lines/hough_lines. html (Printed on Oct. 6, 2016).

What is claimed is:

1. A computer-implemented method for detecting an object framework in an image, comprising:
   (a) obtaining a frame comprising an image;
   (b) pre-processing the image to smooth the image;
   (c) detecting edges in the image to generate an edge map;
   (d) detecting straight lines from the detected edges in the edge map;
   (e) assembling one or more quadrangles from the detected straight lines, wherein the assembling comprises:
      (1) dividing the detected straight lines into horizontal lines and vertical lines;
      (2) dividing the horizontal lines and vertical lines into four quadrants based on each detected straight line's relative position to a center of the frame;
      (3) selecting one detected straight line from each of the four quadrants;
      (4) computing intersection points of selected detected straight lines to create a candidate quadrangle;
      (5) determining whether the candidate quadrangle is a valid candidate quadrangle by determining whether:
         (i) the computed intersection points are inside of the frame;
         (ii) an area of the candidate quadrangle is within a threshold area range; and
         (iii) an angle between adjacent lines of the candidate quadrangle is within a threshold range of 90 degrees; and
      (6) repeating the selecting (e)(3), computing (e)(4), and determining (e)(5) steps for all combinations of a defined number of most dominant detected straight lines from each of the four quadrants;
   (f) sorting the one or more quadrangles;
   (g) selecting one of the one or more quadrangles based on the sorting; and
   (h) returning the selected quadrangle to a user.

2. The computer-implemented method of claim 1, wherein the pre-processing comprises:
   scaling down a resolution of the frame;
   color converting the image to a luminance channel and two chrominance channels; and
   performing a morphology operation to the luminance channel and the two chrominance channels, wherein the morphology operation removes one or more details from the image.

3. The computer-implemented method of claim 2, wherein the pre-processing further comprises:
   applying a filter to the luminance channel only.

4. The computer-implemented method of claim 1, wherein the detecting edges comprises:
   detecting, using a Canny edge detector, edges on a luminance channel and two chrominance channels; and
   merging the edges from the luminance channel and the two chrominance channels using a binary OR operation.

5. The computer-implemented method of claim 1, wherein the detecting the straight lines comprises:
   utilizing a Hough transform to compute straight lines from the edges in the edge map based on where edges exist;
   sorting the computed straight lines; and
   removing one of the computed straight lines based on the sorting, wherein the removing removes the computed straight line that is within a slope threshold and distance threshold of another computed straight line.

6. The computer-implemented method of claim 1, wherein the sorting comprises:
   determining a consistency of the one or more quadrangles, wherein the consistency comprises a measurement that determines how consistent the edges of the one or more quadrangles are with representing actual edges in the image based on the edge map;
   computing an area for each of the one or more quadrangles; and
   sorting the one or more quadrangles based primarily on the consistency and second by the area.

7. The computer-implemented method of claim 6, wherein the one or more quadrangles are selected from multiple continuous frames.

8. The computer-implemented method of claim 7, wherein the selecting the one or more quadrangles further comprises:
   storing candidate quadrangles from the one or more quadrangles in a queue, wherein:
      the candidate quadrangles are from a defined number of most recent multiple continuous frames;
      each time one of the multiple continuous frames beyond the defined number is processed, candidate quadrangles from an earliest of the most recent multiple continuous frames are removed from the queue, and candidate quadrangles from a current frame of the multiple continuous frames is inserted into the queue; and
      the queue is sorted based on the consistency and the area of the candidate quadrangles in the queue.

9. A system for detecting an object framework in an image in a computer system comprising:
   (a) a mobile device comprising:
      (1) an image capture mechanism that captures a frame comprising the image; and
      (2) a display screen;
   (b) an application executing on the mobile device that:
      (1) pre-processes the image to smooth the image;
      (2) detects edges in the image to generate an edge map;
      (3) detects straight lines from the detected edges in the edge map;
      (4) assembles one or more quadrangles from the detected straight lines, wherein the application assembles by:
         (A) dividing the detected straight lines into horizontal lines and vertical lines;
         (B) dividing the horizontal lines and vertical lines into four quadrants based on each detected straight line's relative position to a center of the frame;

(C) selecting one detected straight line from each of the four quadrants;
(D) computing intersection points of selected detected straight lines to create a candidate quadrangle;
(E) determining whether the candidate quadrangle is a valid candidate quadrangle by determining whether:
(i) the computed intersection points are inside of the frame;
(ii) an area of the candidate quadrangle is within a threshold area range; and
(iii) an angle between adjacent lines of the candidate quadrangle is within a threshold range of 90 degrees; and
(F) repeating the selecting (4)(C), computing (4)(D), and determining (4)(E) steps for all combinations of a defined number of most dominant detected straight lines from each of the four quadrants;
(5) sorts the one or more quadrangles;
(6) selects one of the one or more quadrangles based on the sorting; and
(7) returning the selected quadrangle to a user on the display screen.

10. The system of claim 9, wherein the application pre-processes the image by:
scaling down a resolution of the frame;
color converting the image to a luminance channel and two chrominance channels; and
performing a morphology operation to the luminance channel and the two chrominance channels, wherein the morphology operation removes one or more details from the image.

11. The system of claim 10, wherein the application further pre-processes the image by:
applying a filter to the luminance channel only.

12. The system of claim 9, wherein the application detects edges by:
detecting, using a Canny edge detector, edges on the luminance channel and the two chrominance channels; and
merging the edges from a luminance channel and two chrominance channels using a binary OR operation.

13. The system of claim 9, wherein the application detects the straight lines by:
utilizing a Hough transform to compute straight lines from the edges in the edge map based on where edges exist;
sorting the computed straight lines; and
removing one of the computed straight lines based on the sorting, wherein the removing removes the computed straight line that is within a slope threshold and distance threshold of another computed straight line.

14. The system of claim 9, wherein the application sorts by:
determining a consistency of the one or more quadrangles, wherein the consistency comprises a measurement that determines how consistent the edges of the one or more quadrangles are with representing actual edges in the image based on the edge map;
computing an area for each of the one or more quadrangles; and
sorting the one or more quadrangles based primarily on the consistency and second by the area.

15. The system of claim 14, wherein the application selects the one or more quadrangles from multiple continuous frames.

16. The system of claim 15, wherein the application further selects the one or more quadrangles by:
storing candidate quadrangles from the one or more quadrangles in a queue, wherein:
the candidate quadrangles are from a defined number of most recent multiple continuous frames;
each time one of the multiple continuous frames beyond the defined number is processed, candidate quadrangles from an earliest of the most recent multiple continuous frames are removed from the queue, and candidate quadrangles from a current frame of the multiple continuous frames is inserted into the queue; and
the queue is sorted based on the consistency and the area of the candidate quadrangles in the queue.

* * * * *